US008205490B2

(12) United States Patent
Müeller

(10) Patent No.: US 8,205,490 B2
(45) Date of Patent: Jun. 26, 2012

(54) PRESSURE SENSOR FOR MEASUREMENTS IN A CHAMBER OF AN INTERNAL COMBUSTION ENGINE

(75) Inventor: Michael Müeller, Trüllikon (CH)

(73) Assignee: Kistler Holding AG, Winterthur (CH)

( * ) Notice: Subject to any disclaimer, the term of this patent is extended or adjusted under 35 U.S.C. 154(b) by 121 days.

(21) Appl. No.: 12/990,899

(22) PCT Filed: May 12, 2009

(86) PCT No.: PCT/CH2009/000154
§ 371 (c)(1),
(2), (4) Date: Nov. 3, 2010

(87) PCT Pub. No.: WO2009/146565
PCT Pub. Date: Dec. 10, 2009

(65) Prior Publication Data
US 2011/0088460 A1 Apr. 21, 2011

(30) Foreign Application Priority Data

Jun. 4, 2008 (CH) .......................................... 856/08

(51) Int. Cl.
*G01M 15/08* (2006.01)
(52) U.S. Cl. ................... 73/114.19; 73/114.16
(58) Field of Classification Search ............... 73/114.16, 73/114.18, 114.19, 114.21
See application file for complete search history.

(56) References Cited

U.S. PATENT DOCUMENTS

| 4,566,316 | A | 1/1986 | Takeuchi |
| 4,577,510 | A | 3/1986 | Bur et al. |
| 4,604,544 | A | 8/1986 | Konomi et al. |
| 7,032,438 | B2 * | 4/2006 | Heinzelmann et al. ..... 73/114.21 |
| 7,472,600 | B2 * | 1/2009 | Wolfer et al. .................... 73/723 |
| 7,581,520 | B2 * | 9/2009 | Kern et al. ................. 123/145 A |
| 7,712,444 | B2 * | 5/2010 | Kern et al. ................. 123/145 A |
| 7,954,382 | B2 * | 6/2011 | Kern et al. ........................ 73/715 |
| 7,994,690 | B2 * | 8/2011 | Wolfer et al. .................. 310/338 |
| 8,074,502 | B2 * | 12/2011 | Mueller et al. .............. 73/114.19 |
| 2005/0252297 | A1 * | 11/2005 | Heinzelmann et al. ......... 73/708 |
| 2006/0032472 | A1 * | 2/2006 | Yamada et al. ............ 123/145 A |
| 2007/0289370 | A1 * | 12/2007 | Hirose et al. .................... 73/116 |

(Continued)

FOREIGN PATENT DOCUMENTS
DE 196 80 912 T1 10/1997
(Continued)

OTHER PUBLICATIONS
International Search Report on Patentability, issued Jul. 23, 2009.
(Continued)

*Primary Examiner* — Freddie Kirkland, III
(74) *Attorney, Agent, or Firm* — Dority & Manning, P.A.

(57) ABSTRACT

A pressure sensor for measurements in a chamber of an internal combustion engine, in particular a pressure-measuring glowplug, comprises a housing, a pressure element for picking up a pressure, and a measuring element arranged in the housing downstream of the pressure element in the direction of the pressure and having a sensor element and a diaphragm. This diaphragm is permanently connected at its first end to the pressure element, and at its second end it is directly or indirectly permanently connected to the housing at a connection, with the pressure element being supported on the measuring element via the diaphragm.

20 Claims, 4 Drawing Sheets

U.S. PATENT DOCUMENTS

2009/0026889 A1* 1/2009 Wolfer et al. .................. 310/338
2011/0005308 A1* 1/2011 Kern et al. .................. 73/114.16

FOREIGN PATENT DOCUMENTS

| DE | 102006008639 A1 | 6/2007 |
| --- | --- | --- |
| EP | 1 111 360 A2 | 6/2001 |
| EP | 1460403 | 9/2004 |
| EP | 1557654 | 7/2005 |
| FR | 1251009 A | 1/1961 |
| WO | WO 2004/070334 | 8/2004 |
| WO | WO 2006/089446 A | 8/2006 |
| WO | WO 2007/096205 | 8/2007 |

OTHER PUBLICATIONS

English translation of International Preliminary Examination Report on Patentability, issued Dec. 6, 2010.

* cited by examiner

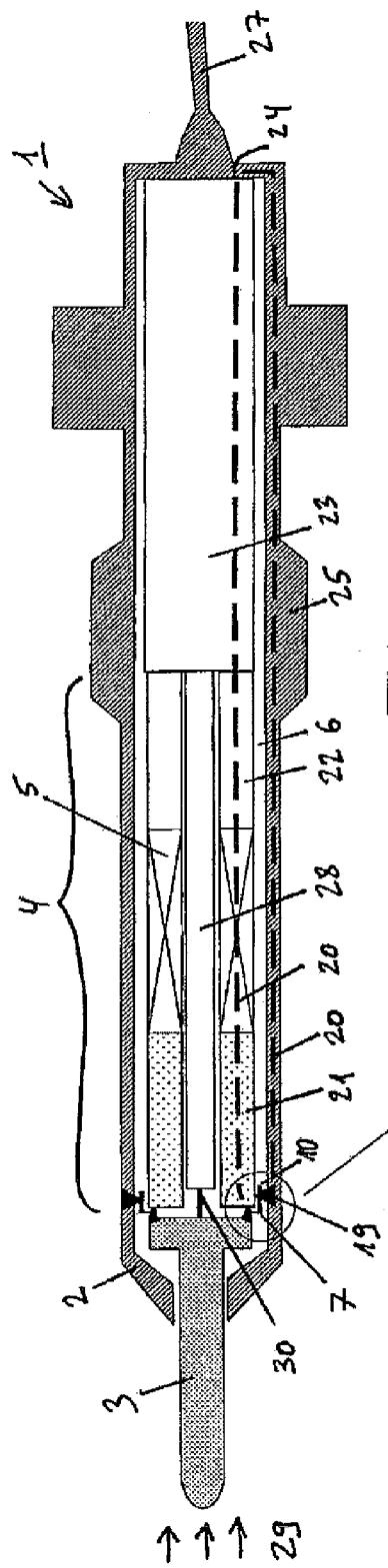
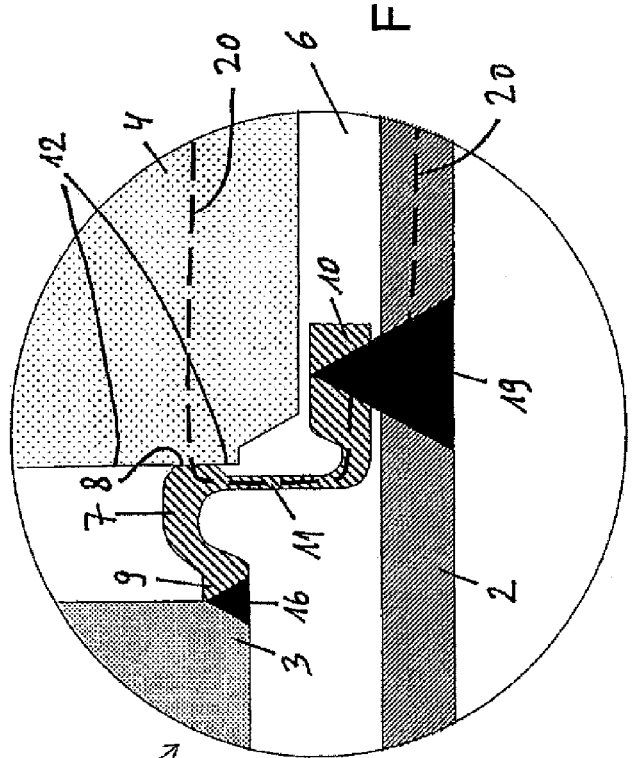
Fig. 2
Fig. 3

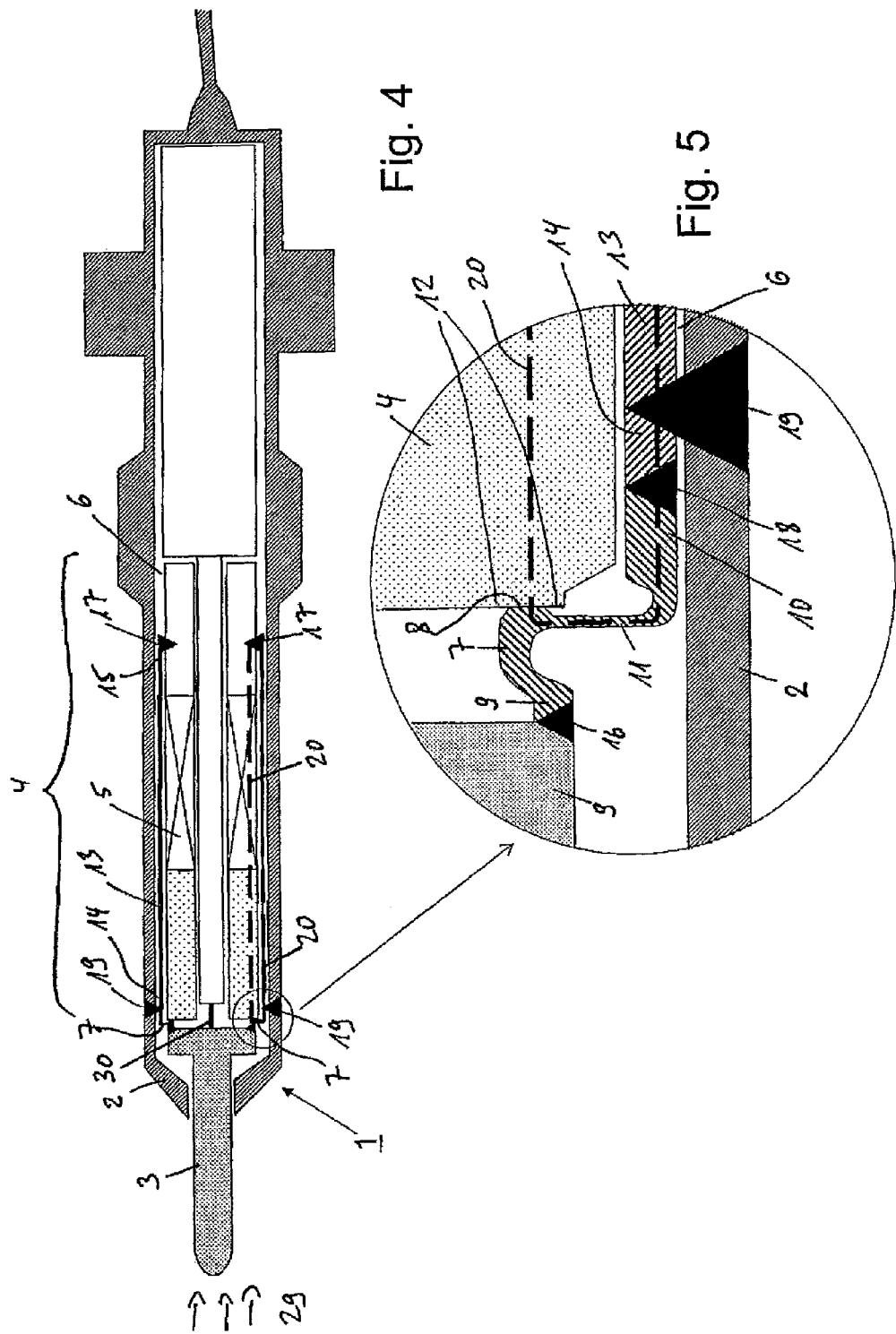

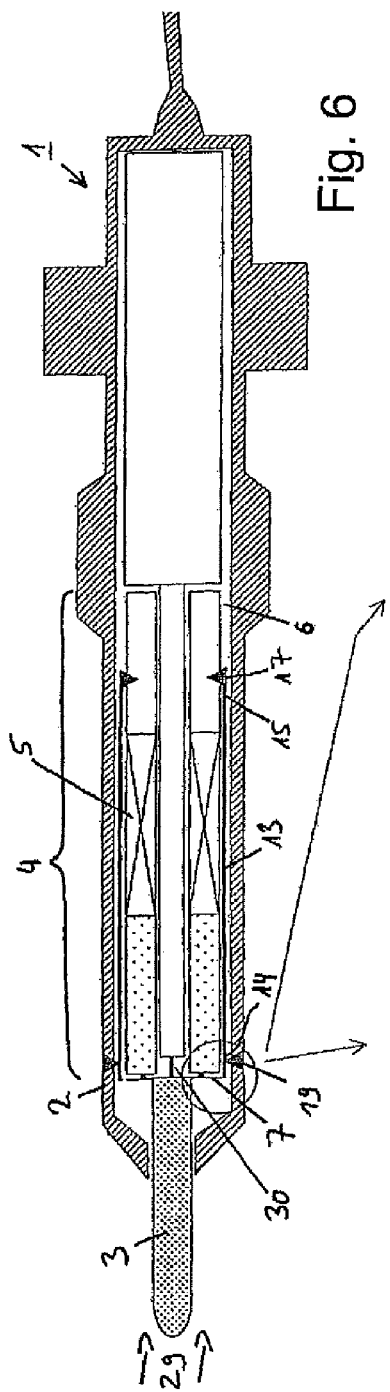
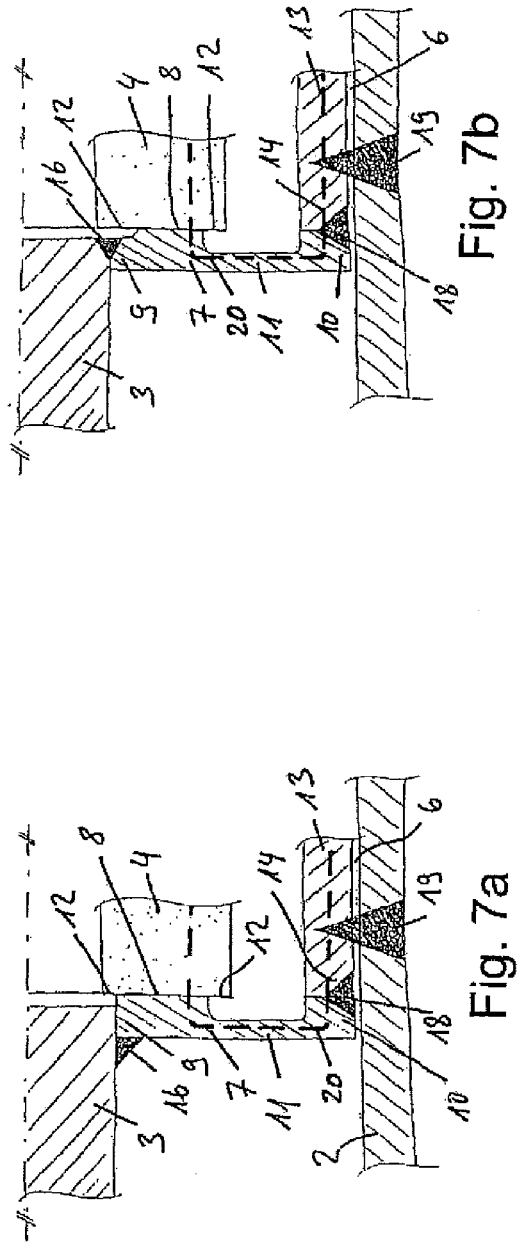
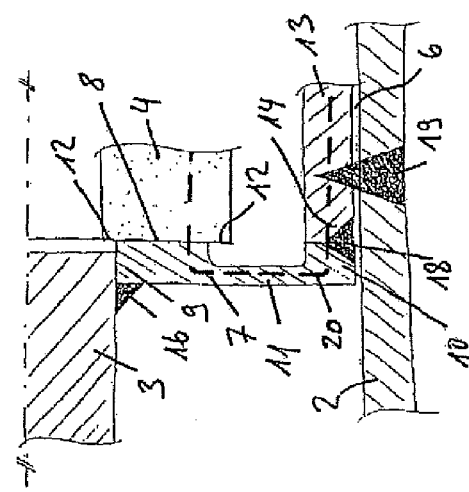

PRESSURE SENSOR FOR MEASUREMENTS IN A CHAMBER OF AN INTERNAL COMBUSTION ENGINE

CROSS-REFERENCE TO RELATED APPLICATIONS

This application claims priority to International Application Serial No. PCT/CH2009/000154 filed May 12, 2009, which claims priority to Swiss Application No. CH 856/08 filed Jun. 4, 2008.

TECHNICAL FIELD

The invention relates to a pressure sensor for measurements in a chamber of an internal combustion engine, in particular a pressure-measuring glowplug, comprising a housing, a pressure element for picking up a pressure, and a measuring element arranged in the housing downstream of the pressure element in the pressure direction and having a sensor element and a diaphragm which is permanently connected at its first end to the pressure element and is permanently directly or indirectly connected at its second end to the housing.

BACKGROUND

Similar pressure sensors to that mentioned at the start are known for example from WO 2006/089446. In this pressure sensor, a diaphragm is situated in the front region of the glowplug, which diaphragm seals off the interior of the housing from the combustion space. A prestress can also be applied to the sensor by means of this diaphragm.

The reference symbols are identical for all the figures.

FIG. 1 shows a schematic illustration of a pressure sensor 1 in section according to the prior art from WO 2006/089446.

This pressure sensor 1 comprises a housing 2, in the front region of which a pressure element 3, in this case configured as a glowplug, is inserted, which projects out of the housing 2. Downstream of the pressure element 3 there is a force transmission element 21, downstream of which a sensor element 5 is arranged. Downstream of this sensor element 5 there is a fixing element 22, which bears against a connection element 23 at the rear. The connection element 23 is attached at its rear end to a shoulder 24 of the housing 2. The force transmission element 21, sensor element 5 and fixing element 22 together form a measuring element 4. The sensor element 5 is in the prestressed state in the pressure sensor 1.

To attach the pressure sensor 1, configured as a pressure-measuring glowplug, in a bore provided for it in a cylinder head, the housing 2 generally has a thread 25 and a hexagon 26 as a working surface for a tool. In the rearmost region of the glowplug there is the exit for the wiring 27, which also includes lines for the measuring element 4.

in the front region of the pressure sensor 1 there is a diaphragm 7 which seals off the interior 6 of the housing for example from the combustion space. A prestress can also be applied to the sensor element 5 by means of this diaphragm 7. The diaphragm 7 is in this embodiment attached at its first end, the inner end, permanently to the pressure element 3 and at its second end, the outer end, to the housing 2.

A pressure in the combustion space or in the chamber 29 is transmitted to the sensor element 5 by means of the pressure element 3 and the force transmission element 21. The measuring element 4 is carried by a pin 28 which runs centrally through it. This pin 28 has no effect on the force transmission. A glow current wire 30 which, in the case of a measuring glowplug, can heat the pressure element 3, also runs in this pin.

The force path 20 is shown with a dotted line on one side in this figure. It runs from the pressure element 3 via the force transmission element 21, via the sensor element 5, via the fixing element 22, via the connection element 23, via the rear shoulder 24, and finally via the housing 2 via the diaphragm 7 back to the pressure element 3. If one of these bearing faces is not shaped precisely and has a resilient bearing which can absorb energy when loaded, a measurement error is produced.

The force transmission from the pressure element 3 to the force transmission element 21 creates the most problems in this embodiment. The material of the pressure element 3 is generally different from the material of the diaphragm. It is very difficult and expensive to produce a pressure element 3 with the required flatness.

Alternative embodiments are also known in which what is known as an "anti-strain" sleeve is applied around the measuring element. This sleeve supports the rear region of the measuring element and is connected to the housing at the front. This means that the sensor is not sensitive to stresses and forces which act on the housing.

It has been shown that a sensor according to the mentioned document WO 2006/089446, in which an anti-strain sleeve was applied, still does not operate satisfactorily. If the force transmission from the pressure element to the force transmission element is elastic, an error creeps in during a measurement as a result.

OBJECTS AND SUMMARY OF THE PRESENT INVENTION

The object of the present invention is to specify a pressure-measuring element of the type mentioned at the start which has fewer sources of error caused by force transmission.

The object is achieved by the features described below.

The idea on which the invention is based consists in the pressure element being supported on the measuring element by means of the diaphragm. The pressure element is thus arranged at a distance from the measuring element. This means it is no longer necessary to create a very precisely defined contact face between the pressure element and the measuring element.

Thanks to this constructive arrangement of the diaphragm, the pressure element now no longer lies in the force path which acts on the sensor during a measurement. An imprecise attachment of the pressure element to another transmission component can thus no longer cause any errors in the measurement. This is therefore important because some pressure elements, such as in particular that of a glowplug, can only be operated with the required accuracy with great effort. In the embodiment according to the invention, the pressure element and its attachment are correspondingly not important for the measurement.

BRIEF DESCRIPTION OF THE DRAWINGS

The invention is explained in more detail below with reference to the drawings. In the figures:

FIG. 2 shows a schematic illustration of a pressure sensor according to the invention in section, showing the force transmission path;

FIG. 3 shows a section of FIG. 2 in the region of the diaphragm, showing the force transmission path;

FIG. 4 shows a schematic illustration of a pressure sensor according to the invention in section with an anti-strain sleeve, showing the force transmission path;

FIG. 5 shows a section of FIG. 4 in the region of the diaphragm, showing the force transmission path;

FIG. 6 shows an alternative schematic illustration of a pressure sensor according to the invention in section with an anti-strain sleeve; and FIG. 7 a, b: shows two variants of a section of FIG. 6 in the region of the diaphragm, showing the force transmission paths.

DETAILED DESCRIPTION OF EXEMPLARY EMBODIMENTS

Figure 1:
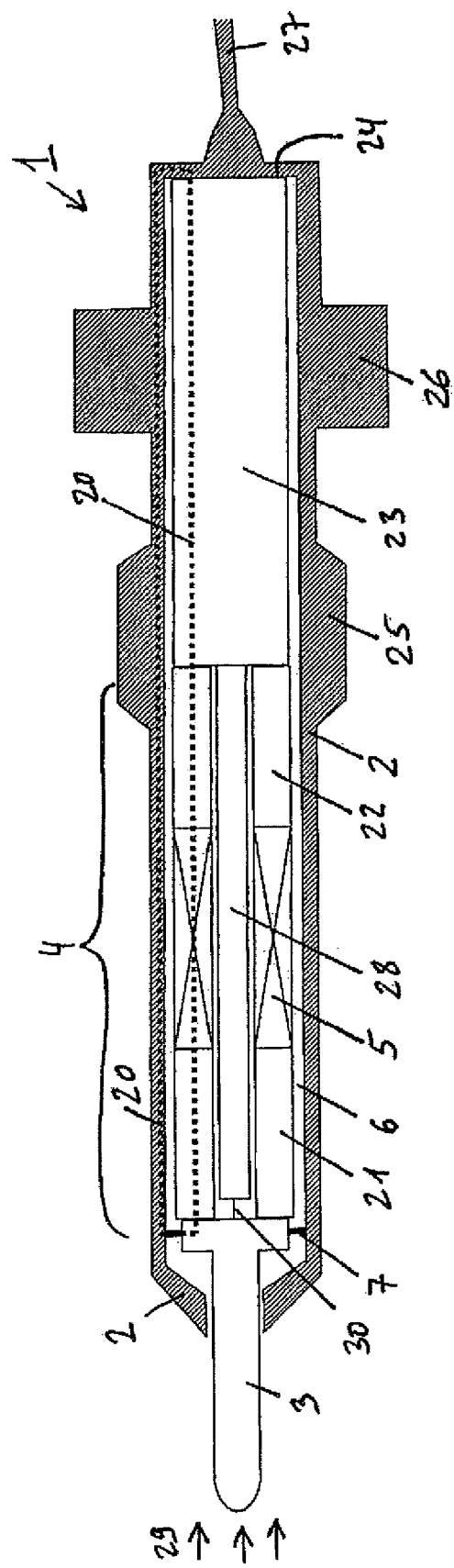
FIG. 1 shows a schematic illustration of a pressure sensor in section according to the prior art, showing the force transmission path.

FIG. 2 shows a configuration according to the invention of a pressure sensor 1 for measurements in a chamber 29 of an internal combustion engine in a preferred embodiment. This illustration likewise comprises a housing 2 and a pressure element 3 which in this case projects out of the housing 2. A measuring element 4 is arranged in the housing 2 downstream of this pressure element 3 in the pressure direction. This measuring element comprises a force transmission element 21, adjacently to this in the pressure direction a sensor element 5 and adjacently to this in the pressure direction a fixing element 22. This fixing element 22 can, as in the prior art, be supported on further components of the pressure sensor 1, such as in this case on the connection element 23 and finally on the shoulder 24 of the housing 2. The force path 20 is indicated in FIG. 2 with dashed lines. It runs via the diaphragm 7 and in particular not via the pressure element 3.

This pressure element 1 is in the preferred embodiment in particular likewise configured as a pressure-measuring glow-plug. In contrast to the prior art, the diaphragm 7 is attached differently in this embodiment according to the invention, as shown in FIG. 3. At its first end 9 it is attached to the pressure element 3 with a connection 16, as before. This connection is preferably cohesive. In the region of the second end 10, it is likewise attached directly or indirectly to the housing 2 with a connection 19. A seal with respect to the housing interior 6 is thus also ensured, as before. The diaphragm 7 has a cut-out in the centre for guiding through a glow current wire 30. As shown in the detailed view of FIG. 3, the pressure element 3 is however supported by means of the diaphragm 7 on a diaphragm bearing face 8 on the measuring element 4. The pressure element 3 therefore does not touch the measuring element 4, these two components 3, 4 are separated from each other by the diaphragm guide 7. The force path 20 runs from the housing 2 via the connection point 19 to the diaphragm 7 and further via the diaphragm bearing face 8 to the measuring element 4 without running through the pressure element.

The fact that the force path 20 now no longer runs through the pressure element 3, as for example in FIG. 1, means that the bearing face between the pressure element 3 and measuring element 4, which was critical for the measurement, has been eliminated. Measurements of much greater accuracy can be achieved thereby. As the rear face of the pressure element 3 is no longer a bearing face, it can be produced roughly and thus cost-effectively, post-machining is no longer necessary.

FIG. 4 and FIG. 5 show embodiments according to the invention as shown in FIG. 2 and FIG. 3, the embodiments in FIG. 4 and FIG. 5 having a tensioning element 13.

This tensioning element 13, which is arranged between the housing 2 and the measuring element 4, is used for prestressing the measuring element 4, which must always be in a prestressed state for a measurement. The fact that the measuring element 4 is supported by means of a tensioning element 13 and not by means of the housing 2, as is usual and as shown in FIG. 1, means that the pressure sensor 1 is not sensitive to stresses and forces which act on the housing 2.

Such a tensioning element 13 is preferably permanently connected directly or indirectly to the housing 2 at a connection 19 in the region of its first end 14, in the region of the diaphragm 7. At its second end 15, downstream of the sensor element 5 viewed in the pressure direction, it is connected permanently to the measuring element 4 at a connection 17. It thus ensures a decoupling from the housing 2 in the rear region, that is, in the region which lies downstream of the permanent connection 19 between the housing and the tensioning element, as viewed in the pressure direction.

In a preferred configuration, the second end of the diaphragm 10 is connected permanently to the first end of the tensioning element 14. This is shown in FIG. 4 and FIG. 6, particularly also in FIG. 5 and FIG. 7a and FIG. 7b. This permanent connection 18 is preferably a weld. A very good connection 18 can be achieved with an I-groove weld, for which reason such a connection is preferred. Full penetration welding is also possible in the region of overlapping diaphragm 7 and tensioning element 13.

To prestress the sensor element 5 in the measuring element 4, a second connection 17 is then applied between the tensioning element and the rear part of the measuring element 4 after this first connection 18. This connection 17 must be arranged downstream of the sensor element 5 as viewed in the pressure direction. Depending on the attachment 16 of the diaphragm 7 to the pressure element 3, the measuring element 4 can be prestressed with the tensioning element 13 first before the pressure element 3 is attached, or the diaphragm is first attached to the pressure element 3 and then the measuring element 4 is prestressed in the tensioning element 13 by applying the second weld 17.

Finally, the prestressed measuring element 4 can be attached to the housing with a full penetration weld 19. This weld 19 must be leakproof in order to seal off the housing interior 6 from the pressure space 29, in particular when used in a combustion space.

This connection 19 can be attached by the diaphragm 7 in the second end region 10 or by the tensioning element 13. The connection 18 between the diaphragm 7 and the tensioning element 13 means that both the second end of the diaphragm 10 and the first end of the tensioning element 14 are in each case attached 19 directly or indirectly to the housing 2.

The tensioning element 13 is preferably a tensioning sleeve which runs around the measuring element 4. Alternatively to this, it can also be configured as a clamp with two or more arms which run as far as into the rear region of the measuring element 4. The advantage of a continuous tensioning sleeve is the simple production and the possibility of applying it to the whole circumference of the measuring element 4.

The force path 20 is likewise shown in FIG. 4 and FIG. 5 with dashed lines. In contrast to FIG. 2 and FIG. 3, it now runs via the tensioning element 13 and no longer via the housing 2. Thanks to the shortened force path, in which fewer components are affected, the source of errors is again greatly reduced.

In a first embodiment, shown in FIG. 2 to FIG. 5, the diaphragm 7 extends at least partially in the region between the pressure element 3 and the measuring element 4. In this arrangement, the diaphragm 7 is preferably attached to a plane of the pressure element 3 which is downstream in the pressure direction.

In an alternative embodiment, shown in FIGS. 6, 7a and 7b, the diaphragm 7 is essentially configured in the form of a perforated disc. This has the advantage that such a diaphragm 7 can be produced as a stamped/pressed part, whereas a diaphragm 7 according to FIG. 3 and FIG. 4 can only be produced as a turned part, which is much more expensive.

In FIG. 7a and FIG. 7b, the diaphragm 7 is preferably attached to a lateral plane of the pressure element 3 which runs transversely to the pressure direction.

in the FIGS. 7a and 7b, different connections 16 of the diaphragm 7 to the pressure element 3 are shown. In FIG. 7a, the connection 16 is realised by a V-groove weld seam, in FIG. 7b by an I-groove weld seam. A full penetration weld is also possible with corresponding design adaptations (not shown here).

The advantage of a V-groove weld seam is that the pressure element 3 can also be attached to the measuring element 4 after the sensor element 5 has been prestressed. The advantage of an I-groove weld seam is that it provides a good connection 16 even with a small radial offset between the diaphragm 7 and the pressure element 3. A full penetration weld can be achieved if the diaphragm 7 of FIG. 7a has a web which encloses the pressure element 3 at its first end 9. A full penetration weld then connects the web to the pressure element 3. The advantage of a full penetration weld lies in that the relative position between the pressure element 3 and the measuring element 4 only has to be defined during the full penetration weld.

The permanent connection 16 from the diaphragm 7 to the pressure element 3 is preferably a weld. Firstly, this connection 16 must be gastight so that the housing interior 6 is sealed off from the combustion space 29. Secondly, this connection 16 is the only permanent connection from the pressure element 3 to the pressure sensor 1, so that no further force path can distort the measurement. Therefore, the connection must be permanent, in particular cohesive, preferably a weld. The glow current wire 30 does not transmit any force at all and is therefore not suitable for fixing the pressure element 3.

In both configurations according to FIG. 5 or according to FIG. 7, the measuring element 4 has an overhang 12, both inwardly and outwardly, with respect to the diaphragm bearing face 8. This ensures that the diaphragm 7 always bears completely on the measuring element 4, even if the measuring element 4 is to be displaced laterally relative to the diaphragm 7. If there was no overhang 12, the diaphragm properties would change owing to the changed bearing 8 and thereby affect the measurement.

The diaphragm 7 has an elastic region 11 for the pressure transmission between the diaphragm bearing face 8 and the connection 19 to the housing 2. This region should preferably have a thinner material thickness than the rest of the diaphragm 7. The effective diaphragm diameter is inside the elastic diaphragm region 11. The greater the effective diaphragm diameter, the higher the sensitivity of the pressure sensor 1. Therefore the elastically effective region 11 should be attached as far towards the outside as possible. This can be achieved by corresponding shaping of the diaphragm 7, for example with an undercut in the outer region, as shown in FIG. 5.

It is of great advantage, however, if the elastically effective region 11 of the diaphragm 7 is arranged at a distance from the measuring element 4, so that this region 11 always has the same length, irrespective of a possible displacement between the measuring element 4 and the diaphragm 7. In addition, this elastically effective region 11 should also be arranged at a distance from other components of the pressure sensor, in particular from the tensioning element 13 and from the housing 2. Otherwise there would also be the risk here that the effective length of the diaphragm depends on the exact positioning relative to this other component, which would in turn cause a measurement error.

Stainless steel has proven a suitable material for the diaphragm 7 owing to its favourable properties for welding and its corrosion resistance and mechanical loadability. Materials of the categories martensitic stainless steel, particle-hardened martensitic stainless steel and corrosion resistant plastic profile steels are preferably used, in particular the alloys according to DIN material numbers 1.4542, 1.4534, 1.4545, according to UNS Norm UNS S17700, UNS S 15700 or Marvac 125 (produced by Vakuunischmelze GmbH & Co KG in Hanau, Germany). The pressure element 3 generally consists of other materials than the diaphragm 7 because other requirements are made of it. In order nevertheless to be able to enter into a cohesive connection with the diaphragm 7, in particular to be able to be welded to the latter, the pressure element 3 must have metallic components at least in its rear region. The connection between the diaphragm 7 and the housing 2 is also preferably cohesive.

It is in particular advantageous if the components which are exposed to the pressure chamber 29, namely the pressure element 3, the diaphragm 7 and/or the front region of the housing 2 are treated with a surface coating which prevents or reduces soot deposits, corrosion and abrasion. This surface coating can in particular be nanostructured and/or finished with nanoparticles. The non-stick coating E2C 408 has shown good results. Welding the housing 2 in the front region to the pressure element 3 would mean that a further force path would run from the pressure element to the housing and via the measurement element, which would again cause a measurement error. Therefore, the pressure element 3 must not be attached to any other components except for the diaphragm.

List of Reference Symbols
1 Pressure sensor
2 Housing
3 Pressure element
4 Measuring element
5 Sensor element
6 Housing interior
7 Diaphragm
8 Diaphragm bearing face for measuring element
9 First end of diaphragm
10 Second end of diaphragm
11 Elastic region of diaphragm
12 Overhang
13 Tensioning element
14 First end of tensioning element
15 Second end of tensioning element
16 Connection of diaphragm to pressure element
17 Connection of tensioning element to measuring element
18 Connection between tensioning element and diaphragm
19 Connection from the housing to the diaphragm/to the tensioning element
20 Force path
21 Force transmission element
22 Fixing element
23 Connection element
24 Shoulder
25 Thread
26 Hexagon
27 Wiring
28 Pin
29 Combustion space or pressure space, chamber
30 Glow current wire

The invention claimed is:

1. A pressure sensor for measurements in a chamber of an internal combustion engine, in particular a pressure-measuring glowplug, comprising:
   a housing,
   a pressure element for picking up a pressure, and
   a measuring element arranged in the housing downstream of the pressure element in the direction of the pressure and having a sensor element and a diaphragm, which is permanently connected at its first end to the pressure element and at its second end is directly or indirectly permanently connected to the housing at a connection,
   wherein the pressure element is supported by the diaphragm, the latter being supported on the measuring element so that the closed force path runs during operation from the diaphragm directly via the measuring element and in particular not via the pressure element.

2. The pressure sensor according to claim 1, wherein the pressure element projects at least partially out of the housing.

3. The pressure sensor according to claim 1, wherein the diaphragm has a cut-out in the centre for guiding through foreign elements, in particular for guiding through a glow current wire.

4. The pressure sensor according to claim 1, wherein the diaphragm extends at least partially into the region between the pressure element and the measuring element.

5. The pressure sensor according to claim 4, wherein the diaphragm is attached to a plane of the pressure element which is downstream in the pressure direction.

6. The pressure sensor according to claim 1, wherein the diaphragm is essentially configured in the form of a perforated disc.

7. The pressure sensor according to claim 6, wherein the diaphragm is attached to a lateral plane of the pressure element which runs transversely to the pressure direction.

8. The pressure sensor according to claim 1, wherein the connection between the pressure element and the diaphragm is an I-groove weld seam, a V-groove weld seam or a full penetration weld.

9. The pressure sensor according to claim 1, wherein the connection between the pressure element and the diaphragm is a gastight connection.

10. The pressure sensor according to claim 1, wherein the measuring element has an overhang both inwardly and outwardly on the bearing face for the diaphragm.

11. The pressure sensor according to claim 1, wherein the diaphragm has an elastically effective region for the pressure transmission between the region which is supported on the measuring element and the connection to the housing, which region is arranged at a distance from all the foreign components.

12. The pressure sensor according to claim 11, wherein the elastically effective region for the pressure transmission is arranged at a distance from all the other components of the pressure sensor, in particular from the tensioning element and from the housing.

13. The pressure sensor according to claim 1, wherein the diaphragm has an elastically effective region for the pressure transmission between the region which is supported on the measuring element and the connection to the housing, which region has a thinner material thickness than the rest of the diaphragm.

14. The pressure sensor according to claim 13, wherein the elastically effective region is arranged at a distance from the measuring element.

15. The pressure sensor according to claim 1, wherein the diaphragm is formed of stainless steel, in particular of a stainless steel according to DIN material numbers 1.4542, 1.4534, 1.4545, UNS S17700 or UNS S 15700, or Marvac 125.

16. The pressure sensor according to claim 1, wherein the pressure element, the diaphragm and/or the front region of the housing are provided with a surface coating, in particular with a nanostructured surface and/or a surface finished with nanoparticles, to prevent or reduce soot deposits, corrosion and abrasion.

17. The pressure sensor according to claim 1, wherein a tensioning element for prestressing the measuring element is arranged between the housing and the measuring element, which tensioning element is connected in the region of its first end, in the vicinity of the diaphragm, directly or indirectly permanently to the housing and at its second end, downstream of the sensor element in the pressure direction, is connected permanently to the measuring element.

18. The pressure sensor according to claim 17, wherein the second end of the diaphragm is connected permanently to the first end of the tensioning element.

19. The pressure sensor according to claim 18, wherein the connection between the diaphragm and the tensioning element is an I-groove seam.

20. The pressure sensor according to claim 17, wherein the tensioning element has a sleeve-like configuration.

* * * * *